United States Patent
He et al.

(10) Patent No.: US 11,796,872 B1
(45) Date of Patent: Oct. 24, 2023

(54) OPTICAL SYSTEMS WITH PIXEL SHIFTING STRUCTURES

(71) Applicant: Apple Inc., Cupertino, CA (US)

(72) Inventors: Ziqian He, Oviedo, FL (US); Xiaokai Li, Mountain View, CA (US); Zhibing Ge, Los Altos, CA (US); Kaikai Guo, San Francisco, CA (US); Yuan Chen, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/459,718

(22) Filed: Aug. 27, 2021

Related U.S. Application Data

(60) Provisional application No. 63/072,003, filed on Aug. 28, 2020.

(51) Int. Cl.
| | |
|---|---|
| *G02F 1/135* | (2006.01) |
| *G02B 6/10* | (2006.01) |
| *G02F 1/13363* | (2006.01) |
| *G02F 1/01* | (2006.01) |
| *G02B 27/01* | (2006.01) |
| *G02F 1/139* | (2006.01) |

(52) U.S. Cl.
CPC ............... *G02F 1/135* (2013.01); *G02B 6/10* (2013.01); *G02B 27/0101* (2013.01); *G02F 1/0136* (2013.01); *G02F 1/1396* (2013.01); *G02F 1/133638* (2021.01); *G02F 2203/01* (2013.01); *G02F 2413/01* (2013.01); *G02F 2413/05* (2013.01); *G02F 2413/12* (2013.01)

(58) Field of Classification Search
CPC .. G02F 1/135; G02F 1/133638; G02F 1/0136; G02F 1/1396; G02F 2203/01; G02F 2413/01; G02F 2413/05; G02F 2413/12
See application file for complete search history.

(56) References Cited

U.S. PATENT DOCUMENTS

| | | | |
|---|---|---|---|
| 6,243,055 B1 * | 6/2001 | Fergason | G09G 3/007 |
| | | | 349/196 |
| 10,115,327 B1 * | 10/2018 | Lee | G09G 3/003 |
| 11,181,815 B1 * | 11/2021 | Wheelwright | G02B 27/0093 |
| 2021/0063765 A1 * | 3/2021 | Yang | H04N 13/337 |

* cited by examiner

*Primary Examiner* — Nathanael R Briggs
(74) *Attorney, Agent, or Firm* — Treyz Law Group, P.C.; Michael H. Lyons

(57) ABSTRACT

A display may include illumination optics, a ferroelectric liquid crystal on silicon (fLCOS) panel, and a waveguide. A twisted nematic cell may be optically interposed between the fLCOS panel and the waveguide. A birefringent crystal may be optically interposed between the cell and the waveguide. The cell may have a first state in which the cell transmits the image light with a first polarization and a second state in which the cell transmits the image light with a second polarization. The crystal may transmit the image light within spatially offset beams based on polarization. In another arrangement, a quarter waveplate may be optically interposed between the cell and the waveguide and a geometric phase grating may be optically interposed between the quarter waveplate and the waveguide. Control circuitry may toggle the cell between the first and second states to maximize the effective resolution of images at an eye box.

18 Claims, 6 Drawing Sheets

OPTICAL SYSTEMS WITH PIXEL SHIFTING STRUCTURES

This application claims the benefit of U.S. Provisional Patent Application No. 63/072,003, filed Aug. 28, 2020, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module and a waveguide. The display module may include a spatial light modulator such as a ferroelectric liquid crystal on silicon (fLCOS) display panel and illumination optics. The illumination optics may include light sources such as light emitting diodes (LEDs) that produce illumination light. The illumination light may be provided with a linear polarization and may be transmitted to the fLCOS display panel. The fLCOS display panel may modulate image data (e.g., image frames) onto the illumination light to produce image light. The waveguide may direct the image light towards an eye box.

A twisted nematic (TN) cell may be optically interposed between the fLCOS display panel and the waveguide. A birefringent crystal may be optically interposed between the TN cell and the waveguide (e.g., between the TN cell and a collimating lens for the waveguide). The image light may be incident upon the TN cell with a first linear polarization. The TN cell may have a first state in which the TN cell transmits the image light with the first linear polarization. The TN cell may have a second state in which the TN cell transmits the image light with a second linear polarization that is different from the first linear polarization. The birefringent crystal may transmit the image light with the first linear polarization within a first beam. The birefringent crystal may transmit the image light with the second linear polarization within a second beam that is spatially offset from the first beam. In another suitable arrangement, a quarter waveplate may be optically interposed between the TN cell and the waveguide and a geometric phase grating may be optically interposed between the quarter waveplate and the waveguide (e.g., where the geometric phase grating is interposed between a collimating lens and the waveguide and where the quarter waveplate is interposed between the TN cell and the waveguide). The quarter waveplate may convert the first and second linear polarizations to left and right hand circular polarizations. The geometric phase grating may diffract left hand circular polarized image light onto a first output angle and may diffract right hand circular polarized image light onto a second output angle. Control circuitry may toggle the TN cell between the first and second states to maximize the effective resolution of images at the eye box.

DETAILED DESCRIPTION

Figure 1:
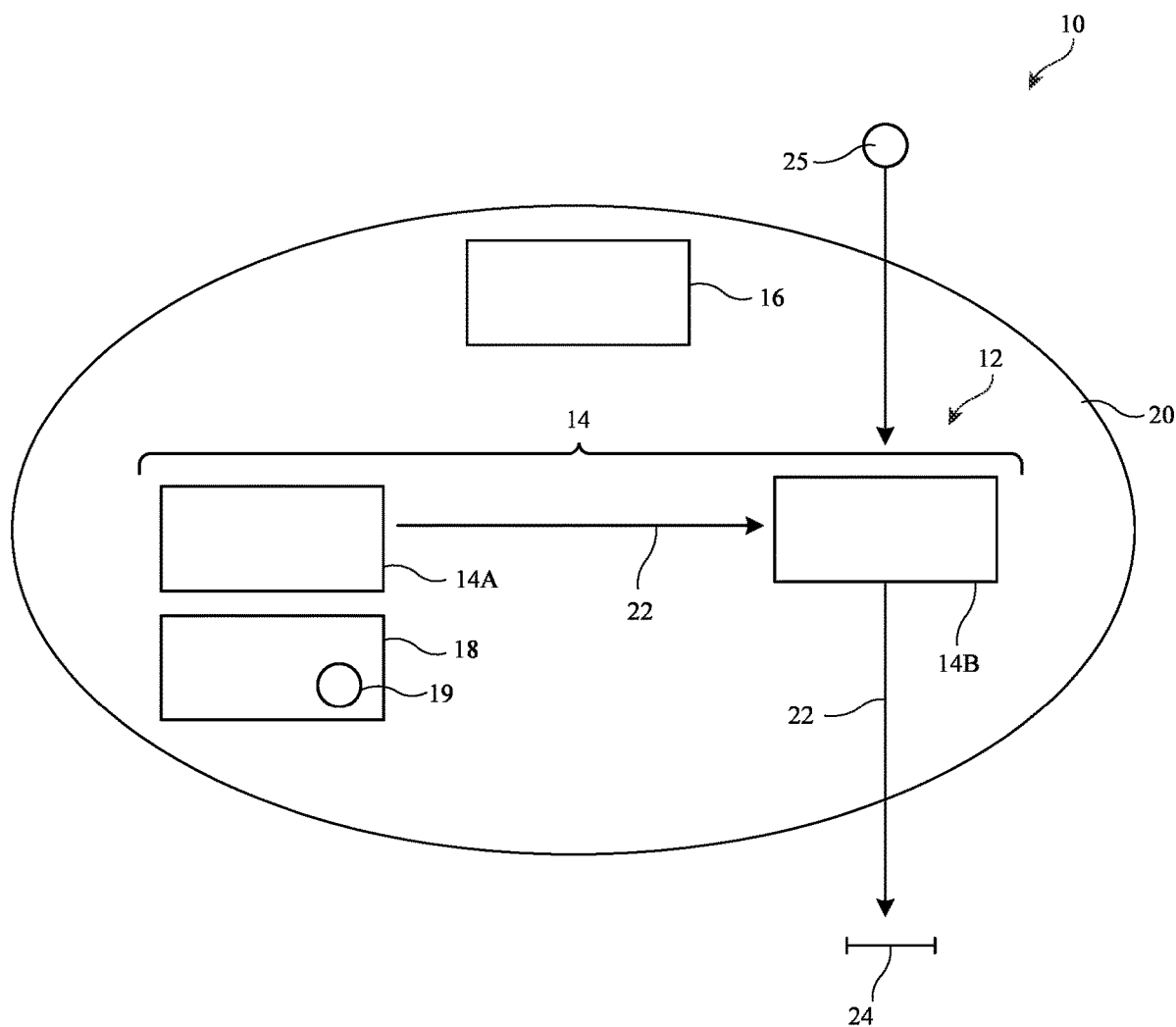
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, the sensors in components 18 may include one or more temperature (T) sensors 19. Temperature sensor(s) 19 may gather temperature sensor data (e.g., temperature values) from one or more locations in system 10. If desired, control circuitry 16 may use the gathered temperature sensor data in controlling the operation of display module 14A.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays (e.g., ferroelectric liquid crystal on silicon (fLCOS) displays), digital-micromirror device (DMD) displays, or other spatial light modulators), emissive displays (e.g., micro-light-emitting diode (uLED) displays, organic light-emitting diode (OLED) displays, laser-based displays, etc.), or displays of other types. An arrangement in which display module 14A includes an fLCOS display is sometimes described herein as an example. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
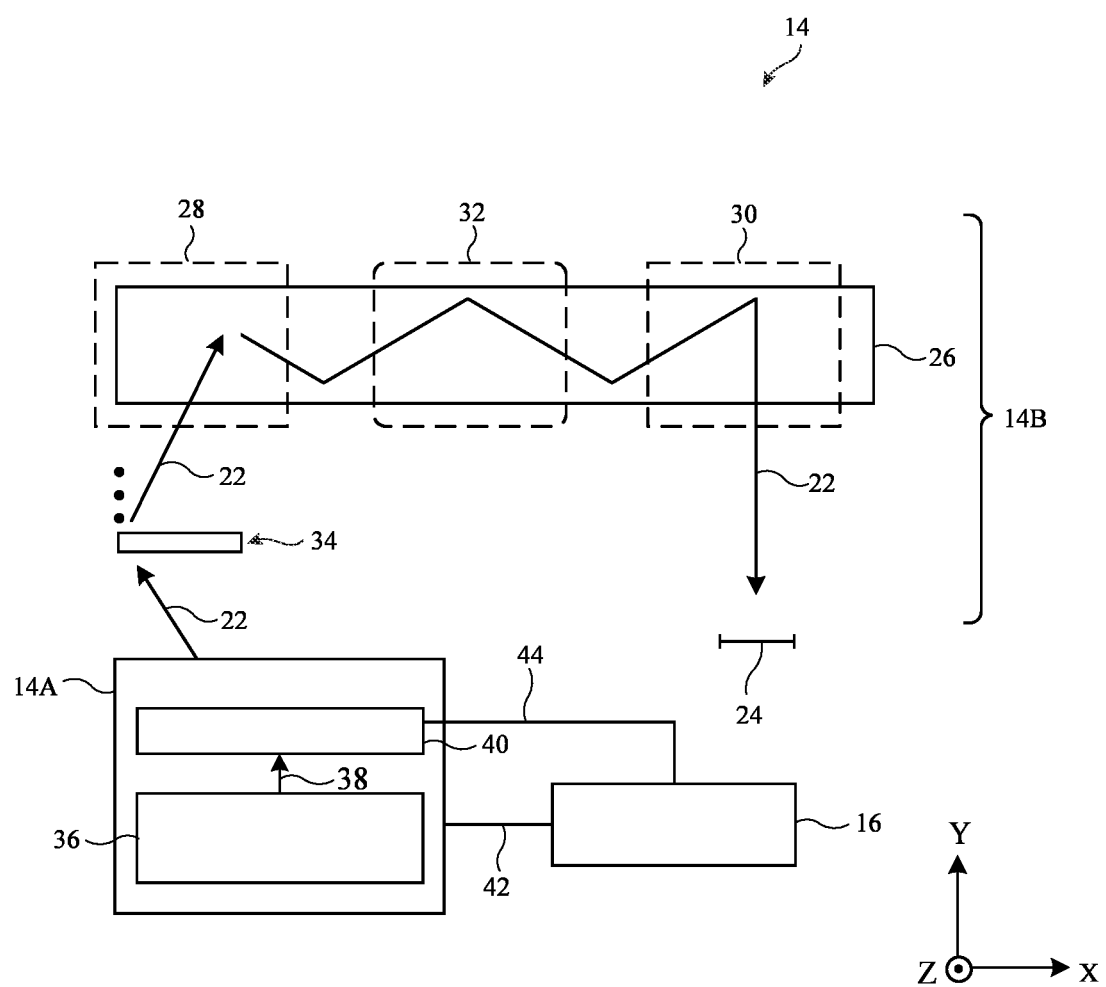
FIG. 2 is a top view of an illustrative optical system for a display having a display module that provides image light to a waveguide in accordance with some embodiments.

FIG. 2 is a top view of an illustrative display 14 that may be used in system 10 of FIG. 1. As shown in FIG. 2, display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 34. Collimating lens 34 may include one or more lens elements that help direct image light 22 towards waveguide 26. Collimating lens 34 is shown external to display module 14A in FIG. 2 for the sake of clarity. In general, collimating lens 34 may be formed entirely external to display module 14A, entirely within display module 14A, or one or more lens elements in collimating lens 34 may be formed in display module 14A (e.g., collimating lens 34 may include both lens elements that are internal to display module 14A and lens elements that are external to display module 14A). Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, control circuitry 16 may control display module 14A to generate image light 22 associated with image content (data) to be displayed to (at) eye box 24. In the example of FIG. 2, display module 14A includes illumination optics 36 and a spatial light modulator such as fLCOS display panel 40 (sometimes referred to herein simply as fLCOS panel 40).

Control circuitry 16 may be coupled to illumination optics 36 over control path(s) 42. Control circuitry 16 may be coupled to fLCOS panel 40 over control path(s) 44. Control circuitry 16 may provide control signals to illumination optics 36 over control path(s) 42 that control illumination optics 36 to produce illumination light 38 (sometimes referred to herein as illumination 38). The control signals may, for example, control illumination optics 36 to produce illumination light 38 using a corresponding illumination sequence. The illumination sequence may involve sequentially illuminating light sources of different colors in illumination optics 36. In one suitable arrangement that is sometimes described herein as an example, the illumination sequence may be a green-heavy illumination sequence.

Illumination optics 36 may illuminate fLCOS display panel 40 using illumination light 38. Control circuitry 16 may provide control signals to fLCOS display panel 40 over control path(s) 44 that control fLCOS display panel 40 to modulate illumination light 38 to produce image light 22. For example, control circuitry 16 may provide image data such as image frames to fLCOS display panel 40. The image light 22 produced by fLCOS display panel 40 may include the image frames identified by the image data. Control circuitry 16 may, for example, control fLCOS display panel 40 to provide fLCOS drive voltage waveforms to electrodes in the display panel. The fLCOS drive voltage waveforms may be overdriven or underdriven to optimize the performance of display module 14A, if desired. While an arrangement in which display module 14A includes fLCOS display panel 40 is described herein as an example, in general, display module 14A may include any other desired type of reflective display panel (e.g., a DMD panel), an emissive display panel, etc.

Image light 22 may be collimated using collimating lens 34 (sometimes referred to herein as collimating optics 34). Optical system 14B may be used to present image light 22 output from display module 14A to eye box 24. Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26 (e.g., at an angle such that the image light can propagate down waveguide 26 via total internal reflection), whereas output coupler 30 may be configured to couple image light 22 from within waveguide 26 to the exterior of waveguide 26 and towards eye box 24. Input coupler 28 may include a reflective or transmissive input coupling prism if desired. As an example, display module(s) 14A may emit image light 22 in the +Y direction towards optical system 14B.

When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions as it propagates down the length of waveguide 26, for example. In this way, display module 14A may provide image light 22 to eye box 24 over an optical path that extends from display module 14A, through collimating lens 34, input coupler 28, cross coupler 32, and output coupler 30.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

Figure 3:
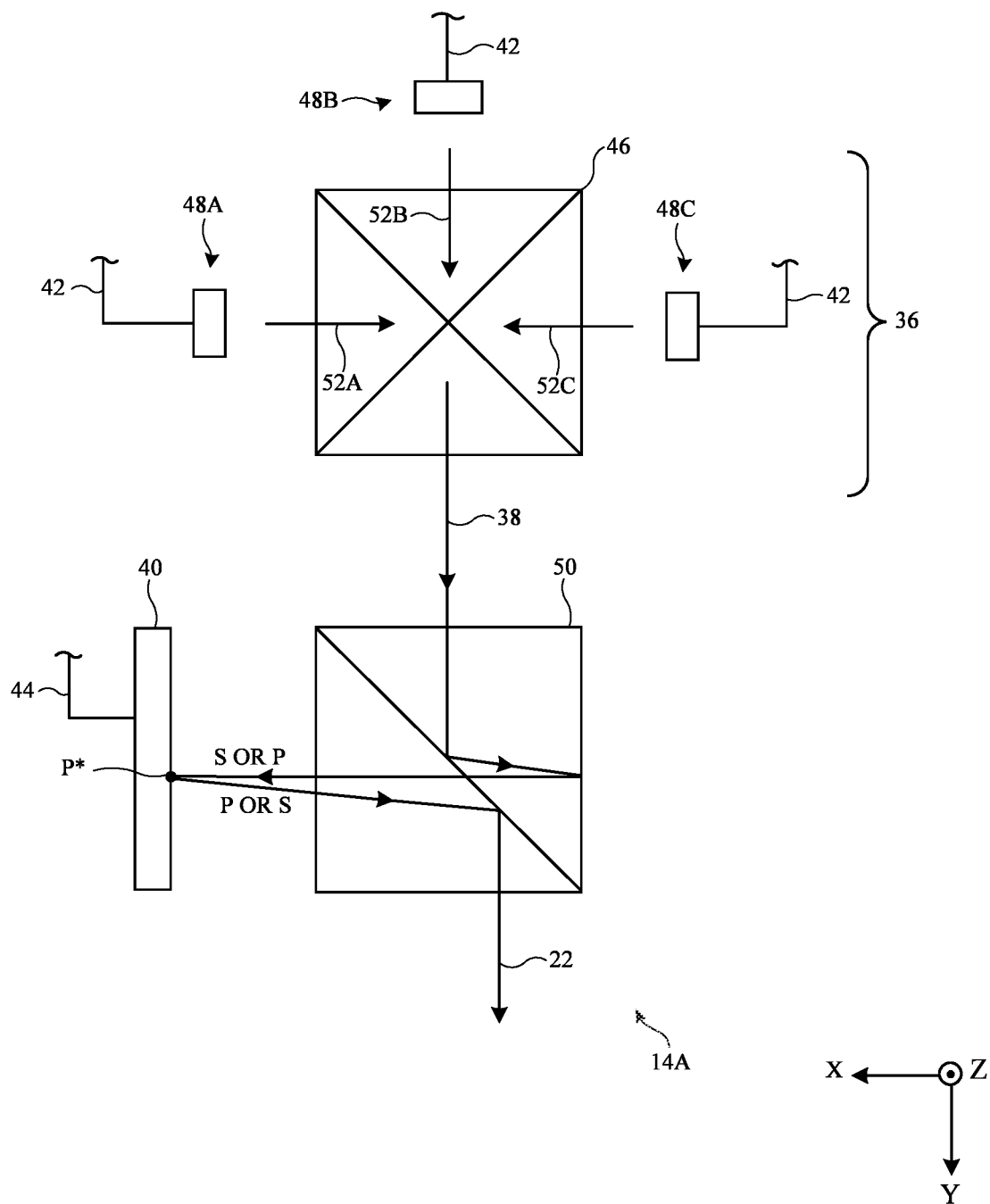
FIG. 3 is a top view of an illustrative display module having a ferroelectric liquid crystal on silicon (fLCOS) display panel in accordance with some embodiments.

FIG. 3 is a top view of display module 14A. As shown in FIG. 3, display module 14A may include illumination optics 36 that provide illumination light 38 to fLCOS display panel 40. fLCOS display panel 40 may modulate images onto illumination light 38 to produce image light 22.

Illumination optics 36 may include one or more light sources 48 such as a first light source 48A, a second light source 48B, and a third light source 48C. Light sources 48 may emit illumination light 52. Prism 46 (e.g., an X-plate) in illumination optics 36 may combine the illumination light 52 emitted by each of the light sources 48 to produce the illumination light 38 that is provided to fLCOS display panel 40. In one suitable arrangement that is sometimes described herein as an example, first light source 48A emits red illumination light 52A (e.g., light source 48A may be a red (R) light source), second light source 48B emits green illumination light 52B (e.g., light source 48B may be a green (G) light source), and third light source 48C emits blue illumination light 52C (e.g., light source 48C may be a blue (B) light source). This is merely illustrative. In general, light sources 48A, 48B, and 48C may respectively emit light in any desired wavelength bands (e.g., visible wavelengths, infrared wavelengths, near-infrared wavelengths, etc.).

An arrangement in which illumination optics 36 includes only one light source 48A, one light source 48B, and one light source 48C is sometimes described herein as an example. This is merely illustrative. If desired, illumination optics 36 may include any desired number of light sources 48A (e.g., an array of light sources 48A), any desired number of light sources 48B (e.g., an array of light sources 48B), and any desired number of light sources 48C (e.g., an array of light sources 48C). Light sources 48A, 48B, and 48C may include LEDs, OLEDs, uLEDs, lasers, or any other desired light sources. An arrangement in which light sources 48A, 48B, and 48C are LED light sources is described herein as an example. Light sources 48A, 48B, and 48C may be controlled (e.g., separately/independently controlled) by control signals received from control circuitry 16 (FIG. 2) over control path(s) 42. The control signals may, for example, control light sources 48A, 48B, and 48C to emit illumination light 52 using a corresponding illumination sequence in which one or more of the light sources emits illumination light at any given time and the active light sources cycle over time.

Illumination light 38 may include the illumination light 52A, 52B, and 52C emitted by light sources 48A, 48B, and 48C, respectively. Prism 50 may provide illumination light 38 to fLCOS display panel 40. If desired, additional optical components such as lens elements, microlenses, polarizers, prisms, beam splitters, and/or diffusers (not shown in FIG. 3 for the sake of clarity) may be optically interposed between light sources 48A-C and fLCOS display panel 40 to help direct illumination light 38 from illumination optics 36 to fLCOS display panel 40.

Prism 50 may direct illumination light 38 onto fLCOS display panel 40 (e.g., onto different pixels P* on fLCOS display panel 40). Control circuitry 16 may provide control signals to fLCOS display panel 40 over control path(s) 44 that control fLCOS display panel 40 to selectively reflect illumination light 38 at each pixel location to produce image light 22 (e.g., image light having an image as modulated onto the illumination light by fLCOS display panel 40). As an example, the control signals may drive fLCOS drive voltage waveforms onto the pixels of fLCOS display panel 40. Prism 50 may direct image light 22 towards collimating lens 34 of FIG. 2.

In general, fLCOS display panel 40 operates on illumination light of a single linear polarization. Polarizing structures interposed on the optical path between light sources 48A-C and fLCOS display panel 40 may convert unpolarized illumination light into linearly polarized illumination light (e.g., s-polarized light or p-polarized illumination light). The polarizing structures may, for example, be optically interposed between prism 50 and fLCOS display panel 40, between prism 46 and prism 50, between light sources 48A-C and prism 46, within light sources 48A-C, or elsewhere.

If a given pixel P* in fLCOS display panel 40 is turned on, the corresponding illumination light may be converted between linear polarizations by that pixel of the display panel. For example, if s-polarized illumination light 38 is incident upon a given pixel P*, fLCOS display panel 40 may reflect the s-polarized illumination light 38 to produce corresponding image light 22 that is p-polarized when pixel P* is turned on. Similarly, if p-polarized illumination light 38 is incident upon pixel P*, fLCOS display panel 40 may reflect the s-polarized illumination light 38 to produce corresponding image light 22 that is s-polarized when pixel P* is turned on. If pixel P* is turned off, the pixel does not convert the polarization of the illumination light, which prevents the illumination light from reflecting out of fLCOS display panel 40 as image light 22.

In practice, it may be desirable to be able to increase both the field of view of and the resolution of the images in image light 22 provided to eye box 24. In one suitable arrangement that is described herein as an example, the effective resolution of images provided to eye box 24 may be increased by performing pixel shifting operations in display 14.

Figure 4:
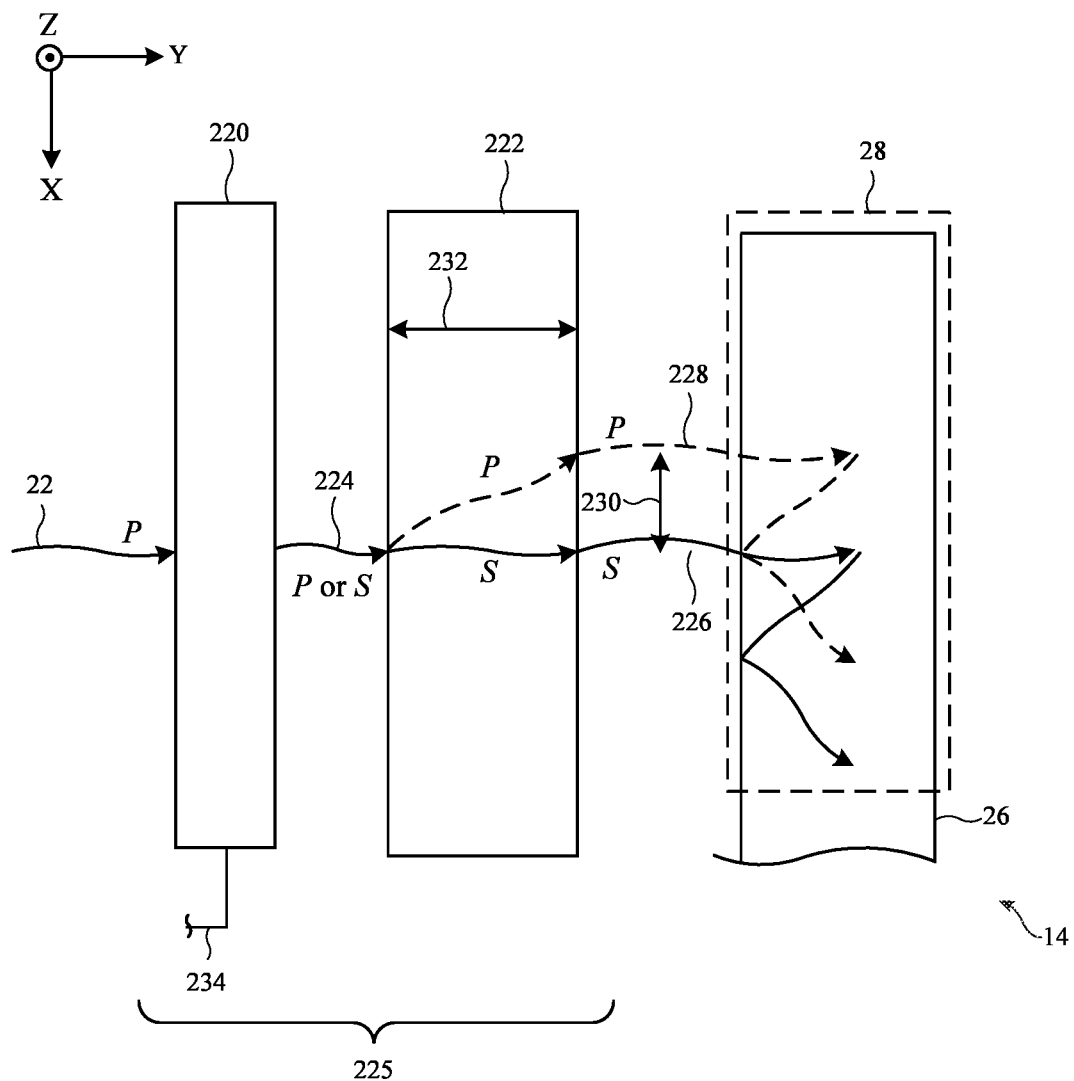
FIG. 4 is a top view of an illustrative display having spatial pixel shifting structures that increase the effective resolution of images provided at an eye box in accordance with some embodiments.

FIG. 4 is a top-down view showing how display 14 may perform spatial pixel shifting operations to maximize the effective resolution of images provided to eye box 24. As shown in FIG. 4, display 14 may include a twisted nematic (TN) cell 220 and a birefringent crystal 222 optically interposed between display module 14A (FIG. 2) and input coupler 28 on waveguide 26. Birefringent crystal 222 may be optically interposed between TN cell 220 and input coupler 28. If desired, TN cell 220 and/or birefringent crystal 222 may be formed within display module 14A of FIG. 2 (e.g., collimating lens 34 of FIG. 2 may be optically interposed between birefringent crystal 220 and input coupler 28).

TN cell 220 may receive image light 22 from fLCOS panel 40 (FIG. 3). Image light 22 may be (linearly) polarized light such as p-polarized light or s-polarized light. An arrangement in which image light 22 is incident upon TN cell 220 as p-polarized light is described herein as an example.

TN cell 220 may receive control signals from control circuitry 16 (FIG. 2) over control path 234. The control signals may toggle TN cell 220 between first and second states. In the first state, TN cell 220 may transmit image light 22 without changing the polarization of image light 22. TN cell 220 may thereby transmit p-polarized image light 22 to birefringent crystal 222 in the first state, as shown by arrow 224. In the second state, TN cell 220 may change the polarization of image light 22 to a different linear polarization. For example, in the second state, TN cell 220 may convert the p-polarized image light 22 received from fLCOS display panel 40 into s-polarized image light 22 and may transmit the s-polarized image light 22 to birefringent crystal 222, as shown by arrow 224.

Birefringent crystal 222 (sometimes referred to herein as birefringent beam displacer 222) may be formed from a birefringent material such as calcite and may have a length (thickness) 232 (e.g., in the direction of the optical path). Birefringent crystal 222 may be a uniaxial birefringent crystal or a biaxial birefringent crystal, as examples. Birefringent crystal 222 may receive p-polarized image light 22 or s-polarized image light 22 from TN cell 220 (e.g., depending on the current state of TN cell 220).

Birefringent crystal 222 may spatially separate incident image light 22 based on the polarization of the image. For example, birefringent crystal 222 may output incident s-polarized image light 22 within a first beam, as shown by arrow 226, and may output incident p-polarized image light 22 within a second beam, as shown by arrow 228. Upon exiting birefringent crystal 222, the second beam (e.g., the p-polarized image light 22) may be separated from the first beam (e.g., the s-polarized image light 22) by displacement 230. The magnitude of displacement 230 may be directly proportional to the length 232 of birefringent crystal 222, for example.

The p-polarized image light 22 may be spatially offset from the s-polarized image light 22 upon in-coupling to waveguide 26 by input coupler 28 (e.g., by displacement 230). The images conveyed by the s-polarized image light 22 may therefore be spatially offset (e.g., by displacement 130) from the images conveyed by the p-polarized image light 22 at eye box 24. Control circuitry 16 may rapidly toggle TN cell 220 between the first and second states to alternate between providing input coupler 28 with p-polarized image light 22 and s-polarized image light 22. Length 232 and thus displacement 230 may be selected so that, when the state of TN cell 220 is toggled more rapidly than the response rate of the human eye (e.g., 24 Hz or faster, 60 Hz or faster, 120 Hz or faster, 240 Hz or faster, etc.), the resulting images provided at eye box 24 exhibit an effective resolution that is greater than the resolution of that would otherwise be conveyed to eye box 24 in the absence of TN cell 220 and birefringent crystal 222. TN cell 220 and birefringent crystal 222 of FIG. 4 may sometimes be referred to collectively herein as spatial pixel shifting structures 225.

The example of FIG. 4 in which display 14 performs spatial pixel shifting operations is merely illustrative. In another suitable arrangement, display 14 may perform angular pixel shifting operations to maximize the effective resolution of images provided to eye box 24.

Figure 5:
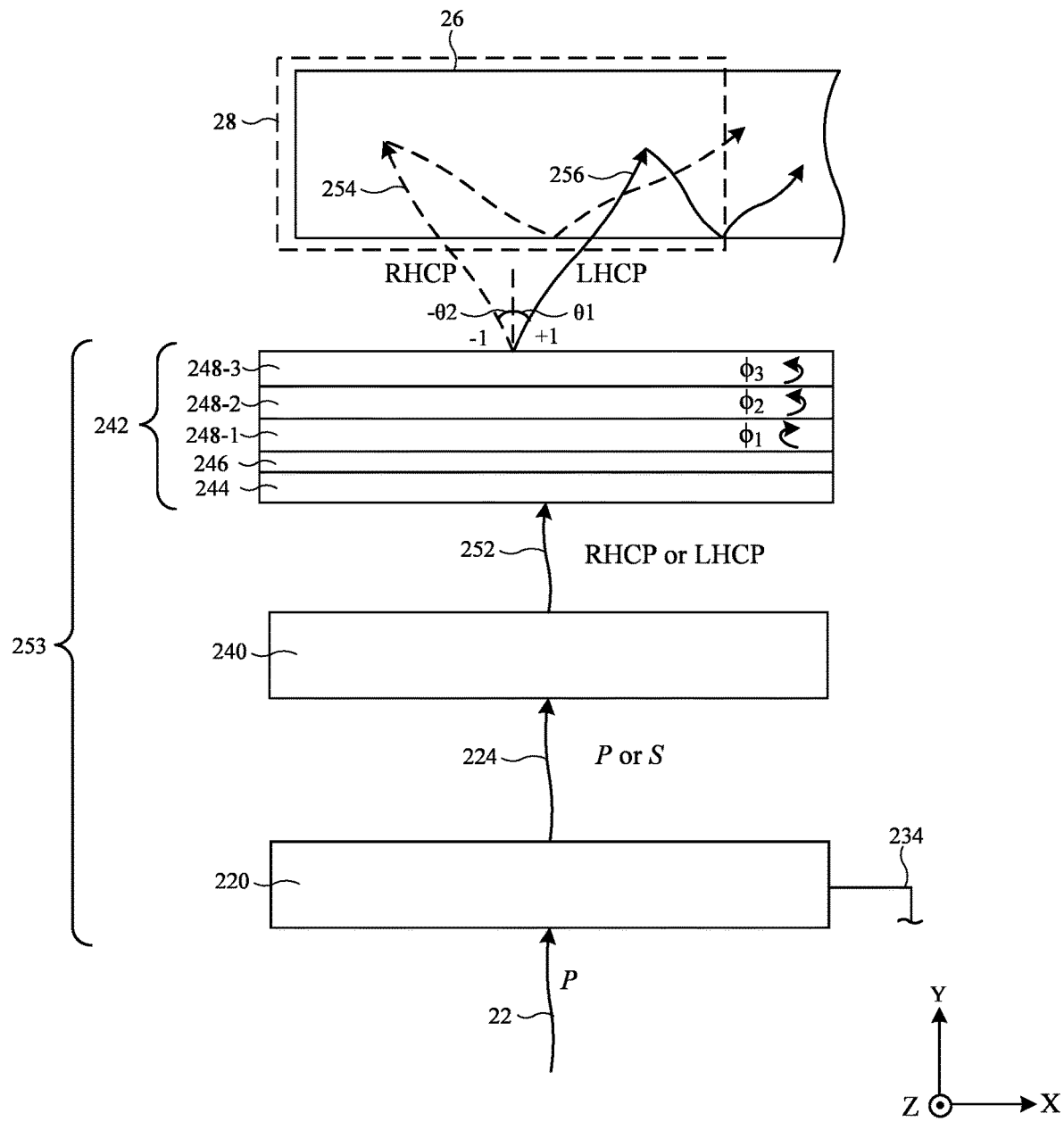
FIG. 5 is a top view of an illustrative display having angular pixel shifting structures that increase the effective resolution of images provided at an eye box in accordance with some embodiments.

FIG. 5 is a top-down view showing how display 14 may perform angular pixel shifting operations to maximize the effective resolution of images provided to eye box 24. As shown in FIG. 5, birefringent crystal 222 of FIG. 4 may be replaced by quarter waveplate 240 and geometric phase grating (GPG) 242. Quarter waveplate 240 may be optically interposed between TN cell 220 and GPG 242. GPG 242 may be optically interposed between quarter waveplate 240 and input coupler 28.

Collimating lens 34 (FIG. 2) may be optically interposed between GPG 242 and input coupler 28, may be optically interposed between quarter waveplate 240 and GPG 242, may be optically interposed between quarter waveplate 240 and TN cell 220, or may be optically interposed between fLCOS display panel 40 and TN cell 220. An arrangement in which collimating lens 34 is optically interposed between quarter waveplate 240 and GPG 242 is described herein as an example. In this example, the collimating lens may serve to focus the pupil of image light 22 onto GPG 242 (e.g., GPG 242 may be located external to display module 14A and at or adjacent input coupler 28 and the entrance pupil of waveguide 26), whereas quarter waveplate 240 and TN cell 220 are located within display module 14A.

Quarter waveplate 240 may convert p-polarized image light 22 (e.g., as provided by TN cell 220 when TN cell 220 is in the first state) into RHCP light that is provided to GPG 242, as shown by arrow 252. Quarter waveplate 240 may convert s-polarized image light 22 (e.g., as provided by TN cell 220 when TN cell 220 is in the second state) into LHCP light that is provided to GPG 242, as shown by arrow 252.

GPG 242 may diffract incident image light 22 received from quarter waveplate 240 onto a corresponding output angle θ (e.g., measured relative to the optical axis or the Y-axis as shown in FIG. 5). GPG 242 may have different diffraction orders that diffract incident image light 22 in different directions based on the polarization of the incident image light. For example, GPG 242 may have a first diffraction order (e.g., a +1 diffraction order) that diffracts incident LHCP image light 22 onto output angle θ1, as shown by arrow 256. GPG 242 may also have a second diffraction order (e.g., a −1 diffraction order) that diffracts incident RHCP image light 22 onto output angle −θ2, as shown by arrow 252. Output angle −θ2 may be equal and opposite output angle θ1 or may be any other desired output angle. The output angles of arrows 254 and 256 may both be oriented on the same side of the optical axis if desired.

In one suitable arrangement that is sometimes described herein as an example, GPG 242 may include a substrate 244 and an alignment layer 246 layered onto substrate 244. GPG 242 may include multiple liquid crystal (LC) layers 248 (e.g., a first LC layer 248-1, a second LC layer 248-2, and a third LC layer 248-3) layered onto alignment layer 246. Alignment layer 246 may serve to align the LC molecules in LC layers 248 at substrate 244 (e.g., with a corresponding grating period). Each LC layer 248 may have a corresponding twist angle φ (e.g., LC layer 248-1 may have a first twist angle $φ_1$, LC layer 248-2 may have a second twist angle $φ_2$ oriented opposite twist angle $φ_1$, and LC layer 248-3 may have a third twist angle $φ_3$ oriented opposite twist angle $φ_1$).

In this way, the LHCP image light 22 may be angularly offset from the RHCP image light 22 upon in-coupling to waveguide 26 by input coupler 28 (e.g., by an angular displacement having a magnitude equal to |θ1|+|θ2|). The images conveyed by the LHCP image light 22 may therefore be angularly offset from the images conveyed by the RHCP image light 22 at eye box 24. Control circuitry 16 may rapidly toggle TN cell between the first and second states to alternate between providing GPG 242 and thus input coupler 28 with LHCP image light 22 and RHCP image light 22. GPG 242 may be configured to output image light 22 at angles θ1 and θ2 that are selected so that, when the state of TN cell 220 is toggled more rapidly than the response rate of the human eye, the resulting images provided at eye box 24 exhibit an effective resolution that is greater than the resolution of the images that would otherwise be conveyed to eye box 24 in the absence of TN cell 220, quarter waveplate 240, and GPG 242. TN cell 220, quarter waveplate 240, and GPG 242 of FIG. 5 may sometimes be referred to collectively herein as angular pixel shifting structures 253. Spatial pixel shifting structures 225 of FIG. 4 and angular pixel shifting structures 253 may sometimes be referred to collectively herein as pixel shifting structures for display 14.

Figure 6:
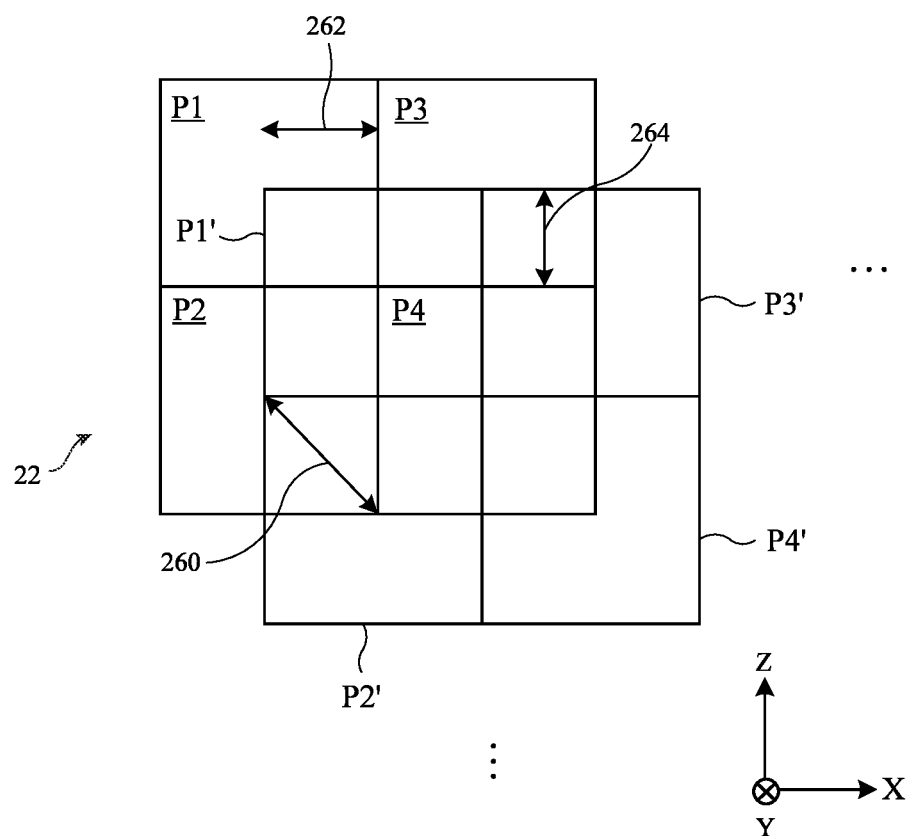
FIG. 6 is a front view of pixels of image light that illustrates how illustrative pixel shifting structures the types shown in FIGS. 4 and 5 may increase the effective resolution of the image light in accordance with some embodiments.

FIG. 6 is a front view showing how the pixel shifting structures in display 14 may provide image light 22 with an increased effective resolution at eye box 24 (e.g., as viewed at eye box 24 in the +Y direction of FIG. 2). In the example of FIG. 6, four pixels of image light 22 are shown for the sake of clarity. In general, image light 22 and the display module may include any desired number of pixels.

As shown in FIG. 6, image light 22 may include pixels P1, P2, P3, and P4 when TN cell 220 of FIGS. 4 and 5 is in the first state (e.g., when TN cell 120 outputs p-polarized light). When TN cell 220 is in the second state (e.g., when TN cell 220 outputs s-polarized light), pixels P1, P2, P3, and P4 may be displaced by displacement 260, as shown by respective pixels P1', P2', P3', and P4'. Displacement 260 may, for example, be a two-dimensional displacement that includes offset 264 parallel to the Z-axis and/or offset 262 parallel to the X-axis. Displacement 260 may be produced by a spatial displacement such as displacement 230 of FIG. 4 (e.g., in scenarios where the pixel shifting structures include spatial pixel shifting structures 225) or by an angular displacement such as an angular displacement having a magnitude equal to |θ1|+|θ2| of FIG. 5 (e.g., in scenarios where the pixel shifting structures include angular pixel shifting structures 253).

Pixels P1, P2, P3, and P4 may exhibit a first pixel pitch and pixels P1', P2', P3', and P4' may also exhibit the first pixel pitch. However, the combination of pixels P1, P2, P3, and P4 with pixels P1', P2', P3', and P4' may exhibit a second pixel pitch that is less than (e.g., half) the first pixel pitch. By rapidly toggling between the first and second states of TN cell 220, image light 22 may effectively include each of pixels P1, P2, P3, P4, P1', P2', P3', and P4' (e.g., as perceived by a user at eye box 24) and thus the second pixel pitch, rather than only pixels P1, P2, P3, and P4 and the first pixel pitch (e.g., in scenarios where pixel shifting structures are omitted from display 14). This may serve to increase the effective resolution of image light 22 relative to scenarios where the pixel shifting structures are omitted (e.g., to twice the resolution that image light 22 would otherwise have in the absence of the pixel shifting structures), without requiring an increase in size or processing resources for display module 14A.

The foregoing is merely illustrative and various modifications can be made to the described embodiments. The foregoing embodiments may be implemented individually or in any combination.

What is claimed is:

1. An electronic device comprising:
    illumination optics configured to produce illumination;
    a ferroelectric liquid crystal on silicon (fLCOS) panel configured to produce light by modulating image data using the illumination;
    a waveguide configured to propagate the light via total internal reflection;
    an input coupling prism on the waveguide and configured to couple the light into the waveguide;
    a twisted nematic (TN) cell optically interposed between the fLCOS panel and the input coupling prism; and
    a birefringent crystal optically interposed between the TN cell and the input coupling prism.

2. The electronic device of claim 1, wherein the birefringent crystal comprises a uniaxial birefringent crystal.

3. The electronic device of claim 1, wherein the birefringent crystal comprises a biaxial birefringent crystal.

4. The electronic device of claim 1, wherein the light is incident upon the TN cell with a first linear polarization.

5. The electronic device of claim 4, wherein the TN cell has a first state in which the TN cell transmits the light to the birefringent crystal with the first linear polarization and wherein the TN cell has a second state in which the TN cell transmits the light to the birefringent crystal with a second linear polarization that is different from the first linear polarization.

6. The electronic device of claim 5, wherein the birefringent crystal is configured to transmit the light with the first linear polarization towards the input coupling prism within a first beam and wherein the birefringent crystal is configured to transmit the light with the second linear polarization towards the input coupling prism within a second beam that is spatially offset from the first beam.

7. The electronic device of claim 6, wherein the image data comprises an image frame having a pixel pitch and wherein the second beam is spatially offset from the first beam by a displacement that is less than the pixel pitch.

8. The electronic device of claim 7, further comprising:
    control circuitry coupled to the TN cell, wherein the control circuitry is configured to toggle the TN cell between the first and second states at a rate greater than or equal to 24 Hz.

9. An electronic device for displaying light, the electronic device comprising:
    a reflective display panel configured to produce light with a first linear polarization by modulating illumination using image data;
    a twisted nematic (TN) cell configured to receive the light from the reflective display panel, wherein the TN cell has a first state in which the TN cell transmits the light with the first linear polarization and a second state in which the TN cell transmits the light with a second linear polarization that is different from the first linear polarization;
    a uniaxial birefringent crystal configured to transmit the light with the first linear polarization within a first beam and configured to transmit the light with the second linear polarization within a second beam that is spatially offset from the first beam;
    control circuitry configured to toggle the TN cell between the first and second states;
    a waveguide configured to propagate the first and second beams of light via total internal reflection; and
    an input coupling prism mounted to the surface of the waveguide, the input coupling prism being configured to receive the first and second beams of light from the uniaxial birefringent crystal and being configured to couple the first and second beams of light into the waveguide.

10. The electronic device of claim 9, wherein the control circuitry is configured to toggle the TN cell between the first and second states at a rate greater than or equal to 24 Hz.

11. The electronic device of claim 9, further comprising a collimating lens optically interposed between the uniaxial birefringent crystal and the input coupling prism.

12. An electronic device for displaying light, the electronic device comprising:
    a projector configured to modulate illumination using image data to generate light having a first linear polarization;
    a cell configured to receive the light from the projector, wherein the cell is toggled between a first state in which the cell transmits the light with the first linear polarization and a second state in which the cell transmits the light with a second linear polarization that is different from the first linear polarization;
    a crystal configured to transmit the light with the first linear polarization within a first beam and configured to transmit the light with the second linear polarization within a second beam that is spatially offset from the first beam;
    a waveguide configured to propagate the first and second beams of light via total internal reflection; and
    an input coupling prism mounted to a surface of the waveguide and configured to couple the first and second beams of light into the waveguide.

13. The electronic device of claim 12, wherein the cell comprises a twisted nematic cell.

14. The electronic device of claim 12, wherein the crystal comprises a uniaxial birefringent crystal.

15. The electronic device of claim 12, wherein the projector comprises a ferroelectric liquid crystal on silicon (fLCOS) panel.

16. The electronic device of claim 12, wherein the cell is toggled between the first and second states at a rate greater than or equal to 24 Hz.

17. The electronic device of claim 12, wherein the crystal is optically coupled between the cell and the input coupling prism.

18. The electronic device of claim 17, further comprising a collimating lens optically coupled between the crystal and the input coupling prism.

* * * * *